United States Patent [19]

Oyama et al.

[11] Patent Number: 4,760,427

[45] Date of Patent: Jul. 26, 1988

[54] EXPOSING APPARATUS FOR COLOR COPIER

[75] Inventors: Hajime Oyama, Ichikawa; Nobuyuki Sato, Yokohama, both of Japan

[73] Assignee: Ricoh Company, Ltd., Tokyo, Japan

[21] Appl. No.: 81,315

[22] Filed: Aug. 4, 1987

[30] Foreign Application Priority Data

Aug. 4, 1986 [JP] Japan ........................ 61-118896[U]
Jul. 15, 1987 [JP] Japan ........................ 62-174906

[51] Int. Cl.[4] ........................ G03B 27/32; G03B 27/52

[52] U.S. Cl. ........................ 355/32; 355/55

[58] Field of Search ........................ 355/1, 55, 4, 32, 35, 355/77, 46; 358/42, 55, 50, 51, 93, 75, 208, 102

[56] References Cited

U.S. PATENT DOCUMENTS

| | | | |
|---|---|---|---|
| 4,110,036 | 8/1978 | Guillaume | 355/32 |
| 4,194,834 | 3/1980 | Guillaume | 355/32 X |
| 4,424,589 | 1/1984 | Thomas et al. | 358/208 X |
| 4,696,545 | 9/1987 | Lama et al. | 355/1 X |

*Primary Examiner*—Richard A. Wintercorn
*Attorney, Agent, or Firm*—Oblon, Fisher, Spivak, McClelland & Maier

[57] ABSTRACT

An exposing apparatus for use in a color copier in which reflection light from an original image mounted on an original mounting plate thereof and illuminated with white light is passed through three color separation filters which are inserted, in sequence, into an optical path of a common focussing system of said copier, and color-separated images obtained from said filters are focussed in sequence on a common image plane. Transparent flat plates having thicknesses suitable to correct optical path lengths for the respective color-separated lights such that effective value of focussing optical path lengths of a focussing element of the focussing system for the respective color-separated lights become equal to a distance of the focussing system between a plane of the original and the image plane are inserted into the focussing optical path in sequence in synchronism with the sequential insertion of the color separating filters into the optical path.

5 Claims, 3 Drawing Sheets

EXPOSING APPARATUS FOR COLOR COPIER

FIELD OF THE INVENTION AND RELATED ART STATEMENT

The present invention relates to an exposing apparatus for a color copier in which an original image is projected through three-color separation filters onto a photosensitive member in color sequence.

As a conventional full-color copier utilizing electrostatic photographic process, a transfer type color copier is well-known, in which an original color image disposed on a contact glass is illuminated with a white light source, reflection light therefrom is filtered sequentially by respective color separation filters and resultant three color images are focussed at a common position on a photosensitive member, resultant latent images are developed with complementary color tones, respectively, and developed images are transferred onto a single copy paper in overlapping relation.

It is known that, even if an optical medium such as glass or water is common, refraction index thereof depends upon wavelength of light to be passed therethrough. As a result, when an image is focussed by a lens, different focal points are obtained depending upon respective color components, causing chromatic aberration. In order to compensate for such chromatic aberration, achromatic lens such as achromat which has two grounds for two different colors or apochromatic lens which has three grounds for three different colors is used in photographic camera. However, such special lens can not be used as a focussing lens of an exposing optical system of a copier in view of manufacturing cost thereof. Further, the use of such special lens is impossible when an array of gradient-index rod lenses (GIRLs) is used in a focussing system of a copier, which is used recently to minimize the size of copier. FIG. 5 shows a variation of conjugate distance of an optical system using an array of GIRLs with a distance between a focussing plane and an original image plane being 63.5 mm, for example. In this case, a contact lens is neglected, i.e., conjugate distance at wavelength of 400 nm is 62 mm and at 700 nm is 66 mm.

Therefore, when reflection light from an original color image is projected onto a photosensitive member held at a fixed position through a blue, green and red filters inserted selectively into an exposing light path, one color image may be focussed while the remaining two color images are not. When a resultant composite color image is developed with three toners of different color and transferred overlappingly, resolution becomes different depending upon colors, resulting in a poor copy.

Such variation of conjugate distance may also occur when the thickness of color separation filters is different from each other. Such color separation filter is made of a transparent substrate of such highly light transmissive glass having a multilayered coating, i.e., the so-called interference filter, preferably. When an organic photoconductor (OPC) etc. which has a spectral sensitivity characteristics for wavelength range not less than 600 nm which is not less than that for a wavelength range from 400 nm to 500 nm is used as a photosensitive member and a halogen lamp capable of producing a large light energy in a long wavelength range is used as an exposing lamp, a red filter of inexpensive triacetete film may be enough although a blue filter and a green filter may be interference filters. In such case where the material and thickness of the red filter are different from those of the other filters, focussing optical path length of focussing element of the exposing optical system becomes different.

As an example, a color copier in which, as shown in FIG. 1, a color separator including a blue filter 3B, a green filter 3G and a red filter 3R arranged radially around a shaft is provided so that one of these filters can be inserted selectively into an optical path of an exposing system composed of a usual lens 1 and mirrors 2, three electrostatic latent images produced on a photosensitive member 5 by exposing it with reflection lights from a single original image and passed through the filters successively are developed by developers 6Y, 6M and 6C containing yellow, magenta and cyan toners which are complemental to blue, green and red, respectively, and resultant images are transferred onto a single transfer paper overlappingly and in which only the red filter 3R is made from a triacetete film, will be described.

The color copier was adjusted such that, when an exposing lamp 4 is a halogen lamp maximum power rate of 500 W, the photosensitive member is of OPC having a peak sensitivity at 550 nm, the blue and green filters 2B and 2G are interference filters comprising glass plates each of 3 mm thick and having multilayered coating and the red filter 2R comprises a triacetete film 100 to 150 nm thick, a copy area, which is obtained by transferring images developed by the yellow and magneta developers 6Y and 6M after exposed through the blue and green filters, becomes 1.000 times that of the original image. In such case, the size of toner image which was obtained by developing a latent image which was, in turn, obtained by exposing the photosensitive member through the red filter was 1.003 times that of the original image.

The original image 10 having three parallel straight black lines 11, 12 and 13 extending in a scanning direction with a distance of 200 mm between adjacent lines, as shown in FIG. 2, was copied by the color copier mentioned above. A yellow toner image 12Y, a magenta toner image 12M and a cyan toner image 12C of the center line 12 on a copy paper 14 were overlapped with each other while cyan toner images 11C and 13C of the outer lines were separated by 0.6 mm outsidely of yellow toner image 11Y (magenta toner image 11M) and yellow toner image 13Y (magenta toner image 13M), respectively, resulting in the so-called color deviation, as shown in FIG. 3.

OBJECT AND SUMMARY OF THE INVENTION

An object of the present invention is to provide an exposing apparatus for use in a color copier of the type in which separated color images are overlappingly transferred onto a copy paper, which has a simplified construction.

In order to achieve the above object, the present invention is featured by inserting transparent flat plates whose thicknesses are effective to correct focussing light path lengths such that effective values of the lengths of a focussing element with respect to the blue, green and red images are made equal to a distance between an original image mounting plate and a predetermined focus plane into the focussing optical path together with insertions of the respective color separation filters thereinto.

The correction of optical path length may also be performed by inserting the transparent plates into the path together with the respective filters while moving the focus element such as lens in the optical axis direction.

DETAILED DESCRIPTION OF THE PREFERRED EMBODIMENTS

It is known that, when a transparent, parallel flat plate having thickness t and refraction index n for air is inserted at right angle into an optical path, an effective optical path length is elongated by $t(1-1/n)$. For example, when the transparent flat plate is a glass plate whose refraction index is 1.5, the optical path length is elongated by $t(1-1/1.5)=t/3$.

Therefore, in order to shorten the effective value of the focussing optical path length, it is enough to insert a glass plate having thickness t selected to make the value given by the above equation equal to a length to be shortened into the optical path. In a case of an equivalent size focussing system, lengths of optical paths in both side of the focussing element such as lens, i.e., an objective distance and an image distance, are equal. Therefore, it is enough to insert glass plates each t/2 thick in the respective optical paths.

Figure 1:
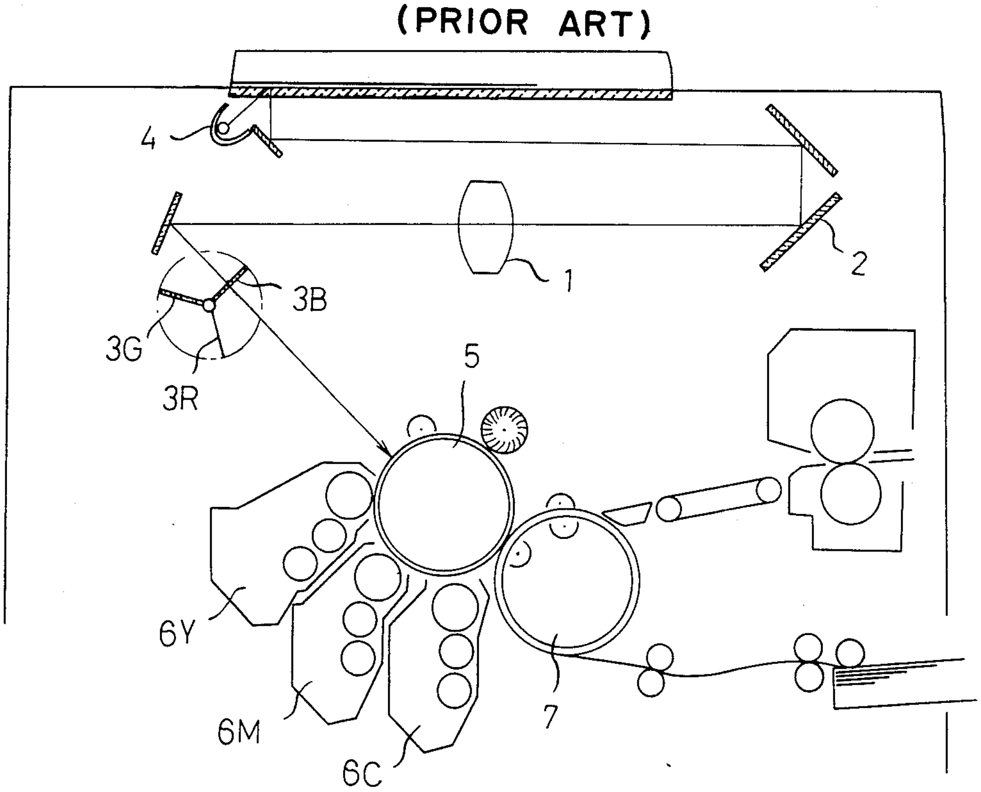
F I G. 1 (PRIOR ART)
FIG. 1 is a schematic illustration of a conventional color copier in cross section.
Figure 2:
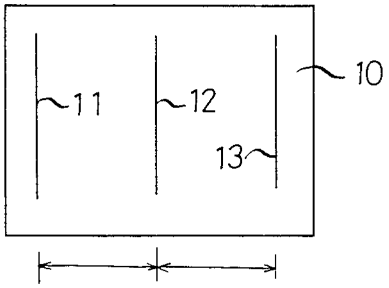
F I G. 2 (PRIOR ART)
FIG. 2 is a plan view of an example of an original image.
Figure 3:
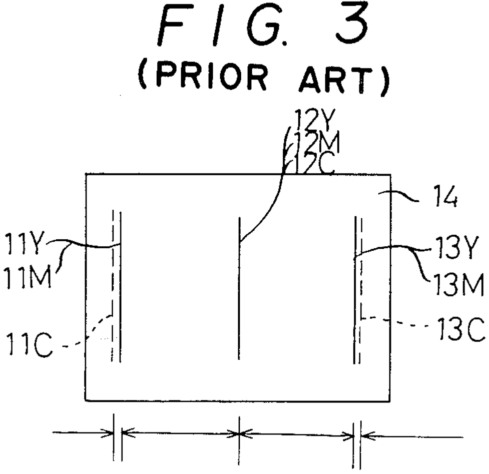
F I G. 3 (PRIOR ART)
FIG. 3 illustrates a color deviation of a copy of the original image in FIG. 2 when the thickness of a red filter of the copier in FIG. 1 is made different from those of a blue filter as well as green filter.
Figure 4:
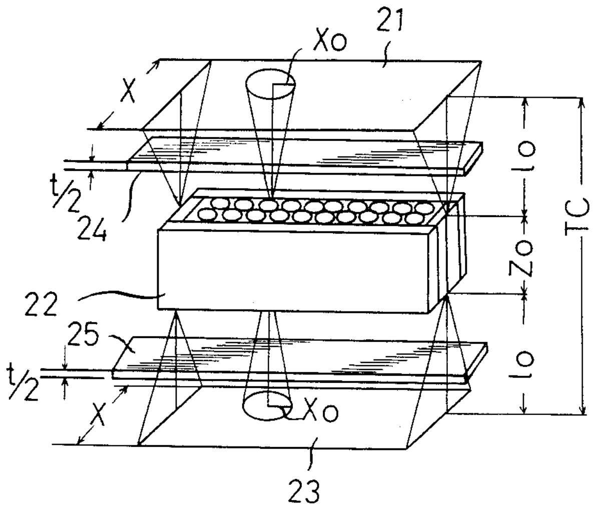
FIG. 4 is a perspective view of an embodiment of the present invention.
Figure 5:
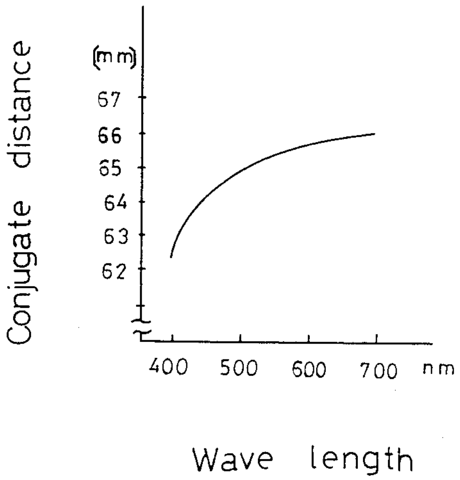
FIG. 5 is a graph showing a variation of conjugate distance of a convergent optical transmission array with respect to light wavelength.

FIG. 4 shows an embodiment of the present invention applied to an equivalent size exposing apparatus of a color copier having a convergent optical transmission element array as the focussing element. In FIG. 4, an image slit on an original plane 21 which is X wide, is focussed by a GIRL array 22 on an image plane 23 of a photosensitive member as a slit having width X. A distance lo between the original plane 21 and an incident plane of the GIRL array 22, which is equal to a distance between an exit plane of the GIRL array 22 and the image plane 23, is expressed by $$lo = \frac{TC - Zo}{2}$$

where Zo is a length of the GIRL array 22 in an optical axis direction and TC is a distance between the original plane 21 and the image plane 23, i.e., conjugate distance. An image of, for example, a circle having radius Xo on the original plane is focussed on the image plane as a circle having radius Xo.

Between the incident plane of the GIRL array 22 and the original plane 21 and between the exit plane of the array 22 and the image plane 23, parallel, flat glass plates 24 and 25 each t/2 thick are inserted into the optical path at right angle thereto, respectively. Either the glass plate 24 or 25 is colored, coated with a very thin colored film or vapor-deposited with an interference membrane, so that it serves also as a color separation filter.

Alternatively, it is possible to prepare the color separation filter and the correction glass plate, separately, such that a total thickness of them becomes equal to t/2.

It is assumed that conjugate distances for green light and red light are longer than that for blue light by about 1.3 mm and about 2 mm, respectively. In such case, the blue filter should be very thin and the correction glass plate should be omitted. For the green filter, a glass plate 2 mm thick is inserted in each side of the GIRL array. For the red filter, a glass plate 3 mm thich is inserted in each side of the GIRL array. With such selection of thickness of the correction glass plate for the respective color filters, the effective optical path length becomes substantially equal to the distance TC between the original plane 1 and the image plane 23, so that these three color images can be focussed on the same image plane.

Figure 6A:
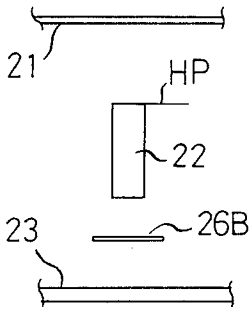
FIGS. 6A, 6B and 6C are illustrations showing thicknesses of the transparent plates to be inserted into the optical path and positions of the focussing element during successive exposures with blue, green and red in another embodiment of the present invention.
Figure 6B:
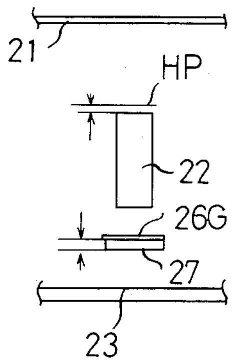
Figure 6C:
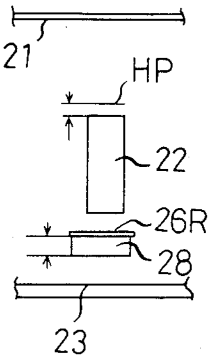

FIGS. 6A, 6B and 6C show another embodiment of the present invention, in which the correction of the effective optical path length is performed by providing a transparent glass plate on an optical path in either an incident side or exit side of a focus element and moving the latter in the optical axis of the system.

In an equivalent size focussing system, an elongation of conjugate distance by S can be also achieved by moving a focus element toward a photosensitive member or an original along an optical axis by S/2 and inserting a transparent glass plate having thickness of $S(1-1/n)$ into an optical path between the focus element and the photosensitive member or between the focus element and the original, where n is a refraction index of glass.

Therefore, when, in an exposing apparatus using a GIRL array, conjugate distances thereof for green and red light are longer than that for blue light by about 1.3 mm and 2 mm, respectively, as in the preceding embodiment, a GIRL array 22 is disposed at equidistant point from an original plane 21 and an image plane 23 with a very thin blue filter 26B between an exit plane of the array and the image plane 23, for blue light exposure, as shown in FIG. 6A.

For green light exposure, the GIRL array 22 is shifted from the position HP thereof for the blue light exposure toward a photosensitive member by 0.65 mm (=1.3 mm/2) with a transparent glass 27 having thickness of 4 mm $(1.3\times(1-1/1.5))$ having a green filter 26G attached thereto being inserted between the array and the image plane 23 of the photosensitive member, as shown in FIG. 6B.

For red light exposure, the array 22 is shifted from the position for the blue light exposure toward the photosensitive member by 1 mm (=2 mm/2) with a glass plate 28 having thickness of 6 mm (=2 mm$\times(1-1/1.5)$) with a red filter 26R attached thereto being inserted between the array and the photosensitive member, as shown in FIG. 6C.

In the above mentioned embodiment, the GIRL array is used as the focussing element. It should be noted, however, that the focussing element may be other element such as usual lens or roof mirror lens array etc. Further, the image plane may be not limited to the photosensitive member. The present invention is also applicable to a readout optics of a color copier of the type in which an opto-electric conversion is performed to readout an imae density and resultant electric signals are modulated with laser beam upon which the image is written-in on the photosensitive member.

Figure 7:
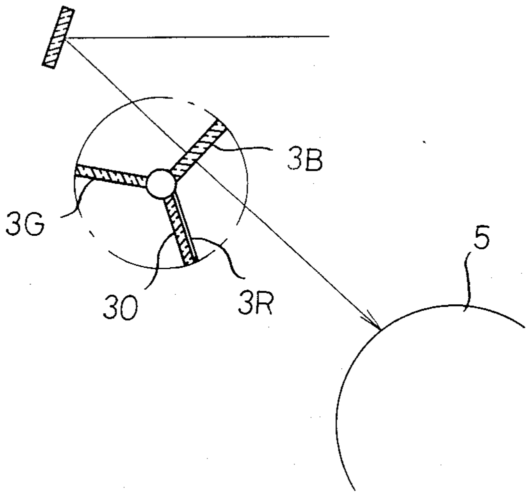
FIG. 7 is a cross section of a color separation filter of another embodiment of the present invention.

FIG. 7 shows another embodiment of the present invention which is capable of correcting the difference in conjugate distance caused by difference in thickness between respective color filters to be selectively inserted into an exposing optics. In FIG. 7, a red filter 3R of triacetate film is attached to a glass plate 30 having same thickness (3 mm) and refraction index as those of glass plates constituting substrates of blue and green filters 3B and 3G tomake conjugate distances of these three filters for three color exposures equal to each other.

With such construction, the problem of color deviation mentioned previously can be avoided.

As mentioned hereinbefore, according to the present invention, images of respective colors are focussed correctly on the image plane and thus it is possible to obtain a sharp copy of high resolution without color deviation.

What is claimed is:

1. An exposing apparatus for use in a color copier in which reflection light from an original image mounted on an original mounting plate thereof and illuminated with white light is passed through three color separation filters which are inserted, in sequence, into an optical path of a common focussing system of said copier, and color-separated images from said filters are focussed in sequence on a common image plane, said exposing apparatus being characterized by including transparent flat plates having thicknesses suitable to correct optical path lengths for said respective color-separated light such that effective values of focussing optical path lengths of a focussing element of said focussing system for the respective color-separated lights become equal to a distance of said focussing system between a plane of the original and said image plane, said transparent flat plates being adapted to be inserted into said focussing optical path in sequence in synchronism with said sequential insertion of said color separating filters into said optical path.

2. The exposing apparatus as claimed in claim 1, wherein said transparent flat plates comprise substrates of said color separation filters, respectively.

3. The exposing apparatus as claimed in claim 1, wherein said transparent flat plates are provided separately from said color separation filters, respectively.

4. The exposing apparatus as claimed in claim 1, wherein said transparent flat plates are laminated with said color separation filters, respectively, with thicknesses of said laminations being equal to each other, when difference in focussing optical path length between said respective color-separated lights is caused by difference in thickness between said color separation filters.

5. An exposing apparatus for use in a color copier in which reflection light from an original image mounted on an original mounting plate thereof and illuminated with white light is passed through three color separation filters which are inserted, in sequence, into an optical path of a common focussing system of said copier, and color-separated images obtained from said filters are focussed in sequence on a common image plane, said exposing apparatus being characterized by that a focussing element of said focussing system is moved along an optical axis of said system such that effective values of focussing optical path lengths of a focussing element of said focussing system for the respective color-separated lights become equal to a distance of said focussing system between a plane of the original and said image plane, while inserting transparent flat plates in either an incident side or an exit side of said focussing element.

* * * * *